US008927903B2

(12) United States Patent
Davidson et al.

(10) Patent No.: US 8,927,903 B2
(45) Date of Patent: Jan. 6, 2015

(54) METHOD AND APPARATUS FOR WELDING WITH CV CONTROL

(71) Applicants: Robert R. Davidson, New London, WI (US); James L. Uecker, Appleton, WI (US); Todd E. Holverson, Appleton, WI (US); David G. Almy, Fremont, WI (US); Curt J. Beck, Appleton, WI (US)

(72) Inventors: Robert R. Davidson, New London, WI (US); James L. Uecker, Appleton, WI (US); Todd E. Holverson, Appleton, WI (US); David G. Almy, Fremont, WI (US); Curt J. Beck, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/079,998

(22) Filed: Nov. 14, 2013

(65) Prior Publication Data
US 2014/0069901 A1    Mar. 13, 2014

Related U.S. Application Data

(63) Continuation of application No. 11/538,612, filed on Oct. 4, 2006, now Pat. No. 8,598,492, which is a continuation of application No. 11/006,280, filed on Dec. 7, 2004, now Pat. No. 7,129,443, which is a continuation of application No. 10/268,514, filed on Oct. 9, 2002, now Pat. No. 6,909,067.

(51) Int. Cl.
*B23K 9/09* (2006.01)
*B23K 9/095* (2006.01)
*B23K 9/10* (2006.01)

(52) U.S. Cl.
CPC ............... *B23K 9/0953* (2013.01); *B23K 9/091* (2013.01); *B23K 9/0956* (2013.01); *B23K 9/1006* (2013.01); *B23K 9/1062* (2013.01)
USPC ................................. 219/130.51; 219/130.21

(58) Field of Classification Search
USPC ............. 219/130.21, 130.31, 130.33, 130.01, 219/130.51, 137 PS
See application file for complete search history.

(56) References Cited

U.S. PATENT DOCUMENTS

| 4,595,820 | A | * | 6/1986 | Richardson | ............ | 219/137 PS |
| 5,349,156 | A | * | 9/1994 | Madigan et al. | ......... | 219/130.01 |
| 2002/0190043 | A1 | * | 12/2002 | Rice et al. | ................ | 219/130.31 |

\* cited by examiner

*Primary Examiner* — Brian Jennison
(74) *Attorney, Agent, or Firm* — George R. Corrigan

(57) ABSTRACT

A method and apparatus for welding is disclosed. The output is preferably a cyclical CV MIG output, and each cycle is divided into segments. An output parameter is sampled a plurality of times within one or more of the segments. The CV output is controlled within the at least one segment in response to the sampling. The parameter is output power, a resistance of the load, an output current, an output voltage, or functions thereof in various embodiments. The control loop is preferably a PI or PID loop. The loop may be applied only within a window. The set point may be taught or fixed. The system can be used to weld with a controlled arc length.

21 Claims, 3 Drawing Sheets

METHOD AND APPARATUS FOR WELDING WITH CV CONTROL

RELATED APPLICATIONS

This is a continuation of, and claims the benefit of the filing date of, U.S. patent application Ser. No. 11/538,612, filed on Oct. 4, 2006, which issued on Dec. 3, 2013 as U.S. Pat. No. 8,598,492, which is a continuation of, and claims the benefit of the filing date of, U.S. patent application Ser. No. 11/006,280, filed on Dec. 7, 2004, which issued on Oct. 31, 2006 as U.S. Pat. No. 7,129,443, which is a continuation of, and claims the benefit of the filing date of, U.S. patent application Ser. No. 10/268,514, filed on Oct. 9, 2002, entitles method and Apparatus For Welding With CV Control, which issued on Jun. 21, 2005 as U.S. Pat. No. 6,909,067.

FIELD OF THE INVENTION

The present invention relates generally to the art of welding power supplies. More specifically, it relates to welding systems that have a CV control.

BACKGROUND OF THE INVENTION

There are many known types of welding systems used for many different welding processes. Welding system, or system for welding, as used herein, includes one or more of a power source, controller, wire feeder, and a source of gas, it may also include peripherals such as robots etc. Welding power supply, as used herein, includes any device capable of supplying welding, plasma cutting, and/or induction heating power including power circuitry, control circuitry and other ancillary circuitry associated therewith.

One type of welding system includes a CC welding power source. A CC welding power source, as used herein, is a current controlled power source, wherein the output current is monitored, and the output is adjusted, to provide the desired current. The current may be constant during the welding process, or may have a desired waveform of varying current.

Another type of welding system includes a CV power source. A CV welding power source, as used herein, is a voltage controlled power source, wherein the output voltage is monitored, and the output is adjusted to provide the desired voltage. The voltage may be constant during the welding process, or may have a desired waveform of varying voltage. Some CV welding power sources use a current command, and adjust the current in response to the monitored voltage, thereby adjusting the arc voltage by the change in current across the load.

One known welding process is a pulsed MIG process. The pulsed MIG process typically has a cyclical output having at least a peak segment with a relatively high current and a background segment with a relatively low current. Generally, it is desirable to maintain a constant arc length during each segment, to help keep the process consistent. Unfortunately, during the process the torch angle and/or distance to the work piece may be inadvertently varied by the welder. This results in undesirable changes to the arc length.

Prior art control schemes attempted to control arc length by using a CV control because arc (load) voltage is generally related to arc length for a given welding current. Thus, keeping a constant voltage for a given current maintains a constant arc length. Most prior art CV controllers for pulsed MIG average the arc voltage over at least one cycle, and then adjust the output for the next cycle in response to the average. The average has been taken over a plurality of cycles, an entire cycle, over only the background segment, or over only the peak segment. Because the average is taken over at least one cycle, the output (and arc length) is not changed until at least the following pulse cycle.

Averaging over one or more cycles yields a control scheme with a relatively slow response. The slow response forced a choice between a tighter arc (which provides better control of the weld puddle), and explosive clearing of shorts and spatter (which adversely affects the quality of the weld).

Accordingly, a control scheme for pulsed MIG that provides fast response to control the arc, and does not result in undesirable short clearing, is needed. Preferably such a control scheme will be able to be used in other processes such as CMT (controlled metal transfer or short circuit) or AC MIG.

SUMMARY OF THE PRESENT INVENTION

According to a first aspect of the invention a method of controlling a welding power supply includes providing a cyclical CV output and dividing each cycle into at least two segments. An output parameter is sampled a plurality of times within at least a one of the segments. The CV output is controlled within the at least one segment in response to the sampling.

According to a second aspect of the invention a system for providing welding power includes a welding power supply, a feedback module, and a controller. The power supply has a CV output with an output voltage, and is a series of cycles, each with at least two segments. The feedback module is connected to the output, and provides feedback to the controller. The controller has a sampling module that receives the feedback, and an output control signal responsive to the sampling module.

The parameter is sampled a plurality of times within at least a second of the segments, or each of the segments, and the CV output is controlled within the second segment, or each of the segments, in response thereto, in alternative embodiments.

Sampling the parameter includes sampling an output power, a resistance of the load, an output current, an output voltage, or functions thereof in various embodiments.

The sampled voltage is compared to a desired voltage to obtain an error, and the output is controlled in response to the error in another embodiment. A gain, preferably dependent upon the segment in which the sampling is taken, is applied to the error, and/or a PI or PID control loop is applied in various embodiments.

The desired voltage is taught at a plurality of data points, or is from a fixed set of data points in other embodiments The output is controlled by changing an output current, an output voltage, or an output power in some alternatives. A minimum output current is provided in another alternative.

The sampling is performed in a window within the segment, and the window does not extend to the beginning or the end of each segment in one embodiment. The output may be controlled to be at least partially a CC output outside of the window.

The arc length is controlled to be a desired length in one embodiment.

The output is a pulsed MIG output, CMT output, and AC MIG output in various embodiments.

The controller includes an error module connected to the sampling module, has a desired voltage input in another embodiment. The controller has a gain module connected to the error module, and/or a PI or PID control modules in additional embodiments. A desired voltage teaching module, or a fixed data point set, provide the desired voltage input in other embodiments.

The controller includes a window module connected to the sampling module, and the controlling in response to the sampling is performed in a window within each segment in another embodiment. The system controller further includes a CC control module, and the output control module responsive to one or both of the CC control module and the sampling module, depending on the state of the window module.

The controller is an arc length controller in another embodiment.

Other principal features and advantages of the invention will become apparent to those skilled in the art upon review of the following drawings, the detailed description and the appended claims.

Figure 1:
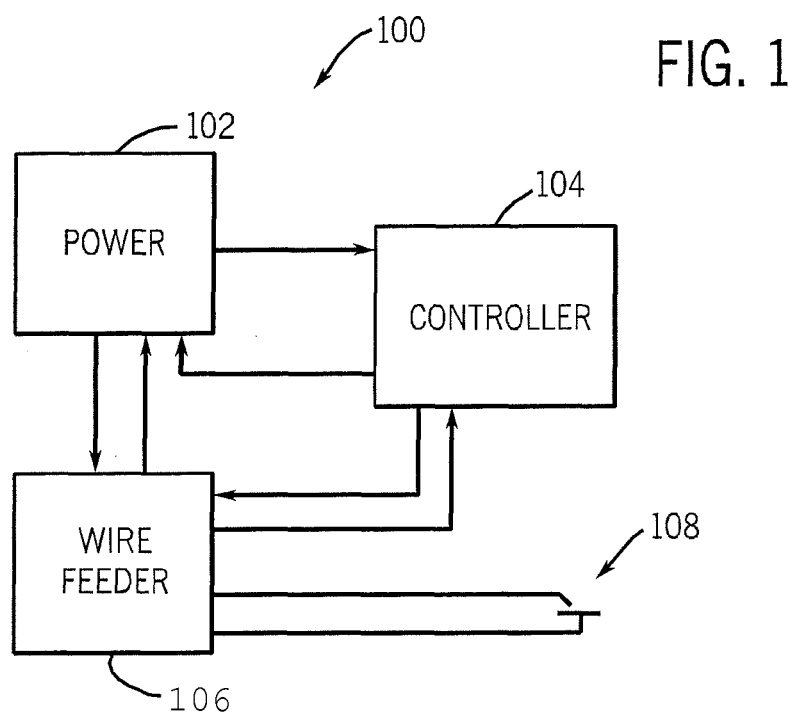
FIG. 1 is block diagram of a system for providing welding power in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system for providing welding power, with particular components, and used for particular processes, it should be understood at the outset that the invention may also be implemented with other welding systems, processes, components, controllers, etc.

Generally, the invention provides for controlling a welding process, such as pulse CV MIG welding, by sampling the output (or arc) voltage within each segment of the output waveform, and adjusting the output in response to the sampling and a desired voltage, for a very fast control. The output is adjusted in response to each sample, or in response to a plurality of samples, but the adjustment is made within the cycle in which the sample or samples are taken.

Preferably, the control scheme provides each segment with a gain, and provides a number of taught or preset data points (of desired voltage) within each segment. The integral term is taken over the current and/or past cycles in various embodiments. The controller provides a control loop with an error, and either a PI or PID control loop in the preferred embodiment. The control is preferably adaptative in that it is taught at various points and it changes the output within a cycle based on the output of that cycle.

The invention may also be implemented with other processes, particularly multi-segment processes like CMT and AC MIG that benefit from a stable arc length.

Because the control is based on output voltage feedback, which is related to arc length, the present invention is readily used to perform a process with constant arc length.

Referring now to FIG. 1, a system for providing welding power 100 in accordance with the present invention includes a power source 102 and a wire feeder 106, that are controlled by a controller 104 to produce a welding arc 108. The various components may be disposed in separate or common housings, and may be in more than one housing (a portion of controller 104 can share a housing with power source 102, while another portion share a housing with wire feeder 106).

Controller, as used herein, includes digital and analog circuitry, discrete or integrated circuitry, DSPs, microprocessors, etc., and software, hardware and firmware, located on one or more boards, used to control a device such as a power supply. The preferred embodiments provides that power source 102 is a Miller networked power source such as that described in U.S. Pat. No. 6,329,636 and wire feeder 106 is a Miller networked wire feeder. Controller 104 is part of the commercially available components in this embodiment.

Preferably, system for providing welding power 100 is a CV MIG power supply and provides a CV MIG output. Power source 102 of the preferred embodiment has a current command and provides an output current, preferably a pulsed output (and is thus a pulsed power supply) in response thereto. It is operated in CV mode by feeding back the output voltage and adjusting the output current to effect the desired change in output voltage. CV output, as used herein, is an output with a controlled voltage that may be used for CV welding. CV power source, as used herein, includes a power source that provides a desired output voltage, either constant, or in accordance with a varying waveform.

Alternative embodiments provide that system for providing welding power 100 be a CMT or AC MIG power supply and provide a CMT or AC MIG output. CMT output, as used herein, is an output that may be used for CMT welding. AC MIG output, as used herein, is an output that may be used for AC MIG welding. CMT power source, as used herein, includes a power source that provides a CMT output. AC MIG power source, as used herein, is a power source that provides an AC MIG output. Other alternatives provide that the sampled output parameter is current, power, load resistance, or arc length.

Figure 2:
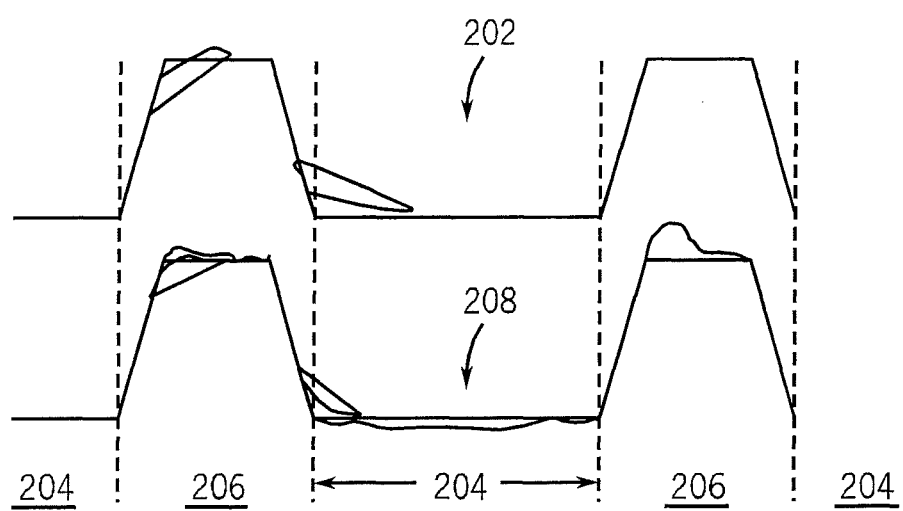
FIG. 2 is a graph showing an output waveform in accordance with the present invention.

Controller 104 controls power supply 102 to provide a cyclical CV output, having at least a peak segment and a background segment. Referring now to FIG. 2, an example of a cyclical CV output from a system for providing welding power in accordance with the present invention is shown, where graph 202 is the voltage waveform and graph 208 is the current waveform. Segments 204 are the background segments and segments 206 are the peak segments. Cyclical welding output, as used herein, includes welding output that may be characterized a as a series of cycles, wherein each cycle may be the same, similar or different. Segment, as used herein, includes a portion of a welding cycle.

Controller 104 is a CV controller and samples the output voltage many times (about every 100 μsec or 10,000 times per cycle in the preferred embodiment) each cycle. The sampling occurs during both the background and peak segments. Each cycle has more than 2 segments in various embodiments, and the sampling occurs in all or less than all of the segments. Sampling, as used herein, includes feeding back an analog signal, or a discrete signal, that is responsive to an output parameter such as voltage, current, arc length, power, or load resistance.

Each output voltage feedback sample is compared to desired output voltage in the preferred embodiment. (Multiple samples within one cycle may be averaged and compared in other embodiments). The difference, or error, is used in a control loop, such as a PI or PID control loop. The gain of the control loop is different for each segment, in the preferred embodiment. Thus, the gain for a sample is dependent upon the segment in which the sample is taken. Alternative embodiments provide for the same gain, or for different gains within the segment.

The output of the control loop is used to control the output current of power source 102 in the preferred embodiment. Changing the output current effects a change in output voltage, and thus a change in arc length.

FIG. 2 shows a rounding of the corners of the transition between segments, which provides a quieter arc. The rounded corners are provided by using a CC control (or partial CC control) scheme near the transitions to obtain a CC output, and the CV control scheme in a window (a sub-segment of a segment) away from the transitions. A CC control, a CV control, or a combination thereof is used to ramp between peak and background in various embodiments.

Another benefit of rounding the corners is a greater immunity to secondary loop inductance. A large sudden change to current is difficult to achieve in an inductive system, although in a CC ramp mode there may be sudden changes to the rate of change of current (DI/DT) at the start and stop of each ramp. By maintaining a voltage, and rounding the corners there are less drastic changes to the current.

CV control, as used herein, includes controlling a power source to provide a desired output voltage, either constant, or in accordance with a varying waveform. CC control, as used herein, includes controlling a power source to provide a desired output current, either constant, or in accordance with a varying waveform. CC output, as used herein, is an output with a controlled current that may be used for CC welding.

The control loop changes the output in response to a given sample within the segment the sample was taken. This is called controlling the process within a given segment.

The wave form of FIG. 2 is divided into two segments, each with CV control within a window and CC control outside of the window. The two segments are peak and background. The waveform could be divided into additional segments, each with a gain. The window does not extend to the beginning or to the end of the segment, and in the preferred embodiment the window covers 90-95% of the segment, with equal portions outside the window on either end. Not extending to the beginning or the end of each segment, as used herein, includes not being with 0.5% of the beginning or the end of the segment. In one embodiment the window extends to one of the beginning and the end of the segment, but not the other.

Controller 104 is taught the desired voltages (from which the errors are derived in conjunction with the sampled voltage) for various wirefeed speeds and the values are interpolated between the taught points in the preferred embodiment. In other words the user sets the desired voltages for a particular waveform, by downloading a waveform, entering a teaching mode, data entry, etc. The desired data points are preset in other embodiments. Each desired voltage is called a data point.

Controller 104 also commands power source 102 to provide a minimum output current, regardless of the feedback loop, so that the arc does not extinguish, or go below a spray threshold. When the minimum is reached, other parameters are controlled to move the current away from the minimum, so that the CV loop can be used to control the process, in one embodiment.

Figure 3:
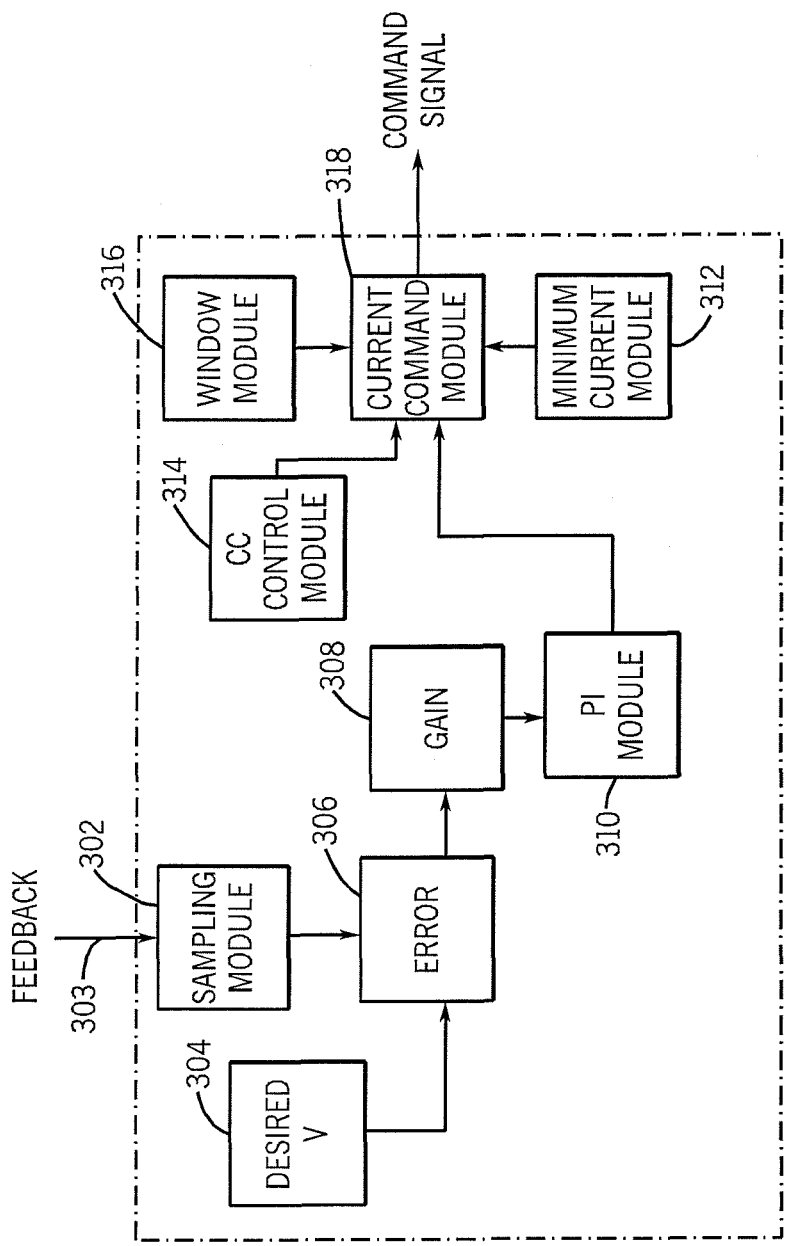
FIG. 3 is a block diagram of a controller in accordance with the present invention.

Referring now to FIG. 3, a block diagram of controller 104 is shown, and includes a feedback or sampling module 302, a desired voltage teaching module (or a fixed data set) 304, an error module 306, a gain module 308, a PI module 310 (or a PID module in an alternative embodiment), a minimum current module 312, a CC control module 314, a window module 316 and a current command module 318, which cooperate to provide a current command signal to power source 102. Module, as used herein, includes software and/or hardware that cooperates to perform one or more tasks, and can include digital commands, control circuitry, power circuitry, networking hardware, etc.

Controller 104 receives a feedback signal on line 303, and provides it to sampling module 302. The feedback signal is indicative of output voltage in the preferred embodiment, but may be other parameters as discussed above. Output voltage (or other output parameters) may be measured at the output studs, in the power supply or wire feeder, at the arc, or other places that indicate the load voltage. The feedback signal may also be a function of the feedback parameter, such as derivative, integral, power, log, product, difference, etc., or combinations thereof. Sampling module 302 samples the feedback signal, or it may receive discrete feedback samples. Controller 104 is a digital controller and implemented with software in the preferred embodiment, and sampling module 303 includes an A-D converter. It is implemented with hardware (digital or analog) in other embodiments.

The signal indicative of the sampled output parameter is provided from sampling module 302 to error module 306. The desired voltage from set point module or desired voltage teaching module 304 is also provided to error module 306, which finds the difference therebetween. Set point module 304 is a look up table in the preferred embodiment, and error module 306 is digitally implemented in the preferred embodiment. A desired voltage is set (taught) for a specific process, wire type, size, gas and wire feed rate in the preferred embodiment. Module 304 interpolates between taught points. If the desired voltage is left at zero, the CV adaptive loop is not active for that waveform segment. Thus, the CV control can be turned off for a particular segment, or part of a segment.

The "rounding" at the transitions (shown in FIG. 2) can be implemented by setting the "taught" value to zero near the transitions, thus turning off the CV control near the transitions. A fast CC ramp can be used to transition to a point at which a slower CV rate of ramping (based on voltage error) can be used to soften corners. This generates a quieter arc (for user appeal) and also makes the system less susceptible to weld cable inductance issues.

The error signal from error module 306 is provided to gain module 308, which applies a gain based on the segment the sample was taken from, in the preferred embodiment. The gain for the segment is chosen to provide a desired response to achieve an output voltage desired for that segment (which also determines the arc length).

The output of gain module 308 is provided to PI control module 310, which applies a PI control scheme and provides as an output a control signal (based on a value proportional to the error and the integral of the error). Alternative embodiments include a PI control scheme, or control schemes based on other functions of the error.

The output of control module 310 is provided to current command module 318 where it is summed with the current command, to effect a change in the output current, in the preferred embodiment. Current command module 318 provides an output current command signal that dictates the magnitude of the current provided by power source 102. The output command dictates output voltage or output power in alternative embodiments, Minimum current module 312 provides a minimum current signal to current command module 318, which insures the current is not commanded to be below a desired threshold. The minimum current prevents the adaptive scheme from forcing the current down to a point where the arc cannot be maintained (seen visually in the arc as an arc outage), or to a level where the desired transfer characteristics are lost.

CC control module 314 also provides a signal to current control module 318, which provides the CC command, used for CC control. CC control module may also receive feedback, and control in accordance with known control schemes. The CC command sets the rate of change between segments in the preferred embodiment.

Window module 316 provides a window signal to current command module 318, indicating if the output wave form is in the window in which the CV control will be applied. The output (state) of window module 316 may be on (inside the window) and current command module 318 sums the CV command with the current command, the state may be off (outside the window) and current command module 318 does not sum the CV command with the current command, or it may call for a scaled back CV command to be added to the current command.

The combined CV and CC controls of the preferred embodiment provide synergistic benefits. The CV ramp prevents the overshoots and undershoots of a strictly CC ramping system. The CC ramp allows the current to change rapidly so that the CV gains can be optimized for the plateau regions of the waveform.

The control modules may be implemented with the following pseudo-code:

```
Sample the Actual_Voltage.
If not in Constant Current mode and a Constant
Voltage command exists for this phase
    {
    Voltage_Error = Desired_Voltage – Actual_Voltage
        CV_Adjustment = Voltage_Error *
Phase_Specific_Gain
        New_Welder_Output_Command =
Old_Welder_Output_Command + CV_Adjustment
        if (New_Welder_Output_Command < Minimum_Current)
            {
            New_Welder_Output_Command =
Minimum_Current ;
            }
    }
```

Figure 4:
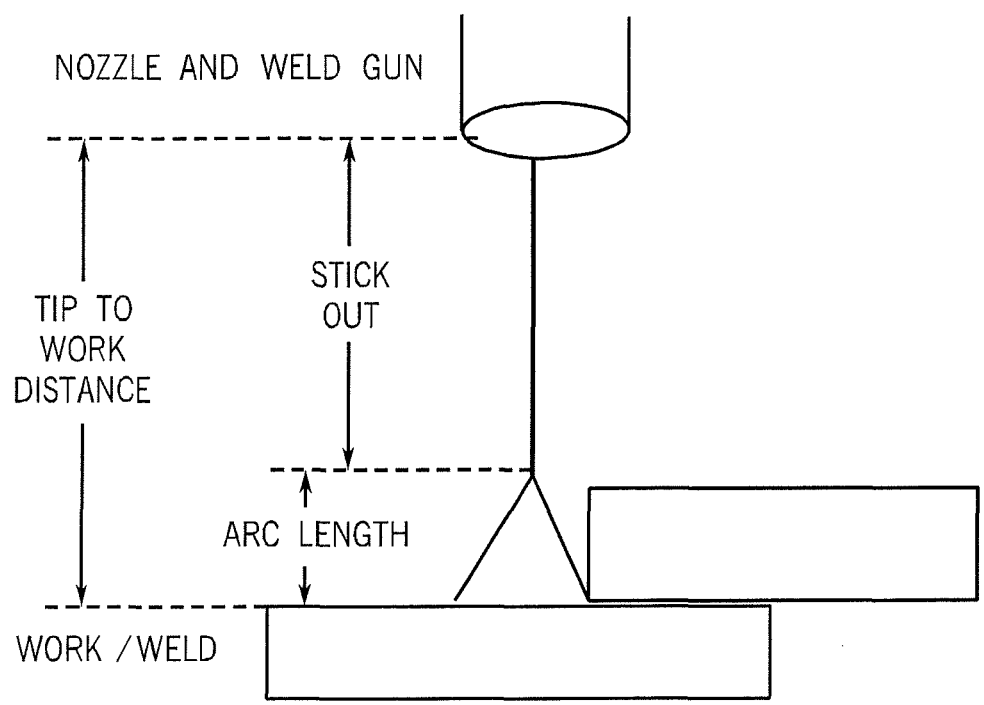
FIG. 4 illustrates a welding arc.

One aspect of the present invention is to use the CV control and controller 104 as an arc length controller. Arc length controller, as used herein, is a controller that controls the output of a system for welding such that the arc length is controlled to be a desired length, preferably a constant length. This is done regardless of changes to torch angle, and stickout. FIG. 4 shows stickout, arc angle, and arc length.

The arc length controller may be implemented with the CV control because arc length generally follows arc voltage. It may also be implemented using other welding output parameters, such as output current, output voltage, output power, load resistance, etc., as the feedback parameter.

The frequent sampling and changing the output in the same cycle provides a very fast response to changes in arc length. This provides a tighter more controllable weld, without the undesirable spatter. The tighter arc allows good weld penetration into the weld piece, but does not have ab excessively fluid weld puddle. The arc length controller embodiment helps the welder weld in a variety of orientations, including vertically up or down.

A minimum peak current setting is provided in one alternative. This would prevent the CV control from driving the peak current so low that the ball (of molten metal) is not detached.

Other alternatives provide that the user can change the frequency (by a fine adjustment knob) to add or subtract arc length for user fine-tuning of the arc. In another alternative, it may be possible to adjust the peak and background voltages, and/or adjust relative times of high and low voltage segments as a different method of adjusting the arc length.

Yet another alternative applies the control scheme to melt rate or a mathematical representation of arc length.

Numerous modifications may be made to the present invention which still fall within the intended scope hereof. Thus, it should be apparent that there has been provided in accordance with the present invention a method and apparatus for arc welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A system for providing welding power, comprising:
a welding power supply having a CV output, wherein the output has an output voltage, and is a series of cycles, each cycle having at least two segments;
a feedback module connected to the output, having an output parameter feedback signal;
a controller, including a sampling module, connected to the feedback module that samples the feedback signal a plurality of times within at least a one of the segments, and an output control signal responsive within the at least one segment to the sampling module.

2. The system for providing welding power of claim 1, wherein the feedback signal is indicative of an output power.

3. The system for providing welding power of claim 1, wherein the feedback signal is indicative of a resistance of the load.

4. The system for providing welding power of claim 1, wherein the feedback signal is indicative of the output voltage.

5. The system for providing welding power of claim 1, wherein the controller further comprises an error module connected to the sampling module and having a desired voltage input, and wherein the output control signal is responsive to the error module.

6. The system for providing welding power of claim 5, further comprising a gain module connected to the error module, and wherein the output control signal is responsive to the gain module.

7. The system for providing welding power of claim 6, further comprising a desired voltage teaching module, wherein the desired voltage input is responsive to a plurality of taught data points.

8. The system for providing welding power claim of 6, wherein the desired voltage input is from a fixed set of data points.

9. The system for providing welding power of claim 4, wherein the controller is a PI controller.

10. The system for providing welding power of claim 5, wherein the controller is a PID controller.

11. The system for providing welding power of claim 1, wherein the output control signal is an output current control signal.

12. The system for providing welding power of claim 1, further comprising a minimum output current module that sets a minimum current.

13. The system for providing welding power of claim 1, wherein the output control signal is an output voltage control signal.

14. The system for providing welding power of claim 1, wherein the controller further comprises a window module, wherein the controlling in response to sampling is performed in a window within each segment, wherein the output control signal is further responsive to the window module.

15. The system for providing welding power of claim 14, wherein controller further includes a CC control module, and the output control module responsive to one or both of the CC control module and the sampling module, depending on the state of the window module.

16. The system for providing welding power of claim 13, wherein the controller is an arc length controller.

17. The system for providing welding power of claim 13, wherein the power supply is a pulsed power supply.

18. The system for providing welding power of claim 13, wherein the power supply is a CMT power supply.

19. The system for providing welding power of claim 13, wherein the power supply is an AC MIG power supply.

20. The welding power supply of claim 1, further comprising means for adjusting an arc length by adjusting a time of a second segment relative to the time of the at least one segment.

21. The welding power supply of claim 12, further comprising means for altering an arc parameter to increase the current above the minimum current.

\* \* \* \* \*